United States Patent
Muccifora et al.

(10) Patent No.: US 12,526,282 B2
(45) Date of Patent: Jan. 13, 2026

(54) GROUP IDENTITY ASSIGNMENT AND POLICY ENFORCEMENT FOR DEVICES WITHIN THE SAME NETWORK

(71) Applicant: Cisco Technology, Inc., San Jose, CA (US)

(72) Inventors: Roberto Muccifora, Ropraz (CH); Domenico Ficara, Essertines-sur-Yverdon (CH); Amine Choukir, Lausanne (CH); Ugo Mario Campiglio, Morges (CH); Shree Murthy, San Jose, CA (US); Stephen M. Orr, Wallkill, NY (US)

(73) Assignee: Cisco Technology, Inc., San Jose, CA (US)

(*) Notice: Subject to any disclaimer, the term of this patent is extended or adjusted under 35 U.S.C. 154(b) by 746 days.

(21) Appl. No.: 17/552,394

(22) Filed: Dec. 16, 2021

(65) Prior Publication Data

US 2023/0198990 A1    Jun. 22, 2023

(51) Int. Cl.
*H04L 9/40* (2022.01)
*H04L 45/74* (2022.01)
*H04L 61/5038* (2022.01)
*H04L 101/622* (2022.01)

(52) U.S. Cl.
CPC ............ *H04L 63/102* (2013.01); *H04L 45/74* (2013.01); *H04L 61/5038* (2022.05); *H04L 63/0876* (2013.01); *H04L 63/104* (2013.01); *H04L 2101/622* (2022.05)

(58) Field of Classification Search
CPC ... H04L 63/102; H04L 61/5038; H04L 45/74; H04L 63/0876; H04L 63/104; H04L 2101/622
See application file for complete search history.

(56) References Cited

U.S. PATENT DOCUMENTS

| | | | | |
|---|---|---|---|---|
| 7,609,689 | B1* | 10/2009 | Desanti | H04L 49/354 370/395.54 |
| 7,996,894 | B1* | 8/2011 | Chen | H04L 63/08 709/239 |

(Continued)

FOREIGN PATENT DOCUMENTS

CN    1801711 B    3/2011

OTHER PUBLICATIONS

IEEE-SA Standards Board, IEEE Standard for Local and Metropolitan Area Networks: Overview and Architecture, Amendment 2: Local Medium Access Control (MAC) Address Usage, 2017 (Year: 2017).*

*Primary Examiner* — Samson B Lemma
(74) *Attorney, Agent, or Firm* — Merchant & Gould P.C.

(57) ABSTRACT

Group identity assignment and policy enforcement may be provided. A User Defined Network Identifier (UDN ID) defining a group of client devices may be received. Next, a client identifier (ID) associated with a source client device that is associated with the group of client devices may be received. The UDN ID and the client ID may be encoded in an Extended Local Identifier (ELI) Media Access Control (MAC) address associated with the source client device. A source MAC address of a packet received from the source client device may then be substituted with the ELI MAC address. Then the packet may be forwarded.

20 Claims, 4 Drawing Sheets

(56) References Cited

U.S. PATENT DOCUMENTS

| | | | |
|---|---|---|---|
| 8,824,678 B2* | 9/2014 | Ochikubo | H04W 12/02 |
| | | | 726/2 |
| 9,130,887 B2* | 9/2015 | Mosko | H04L 12/4633 |
| 9,300,767 B2* | 3/2016 | Liu | H04W 52/0229 |
| 9,462,505 B2* | 10/2016 | Liu | H04L 65/1096 |
| 10,063,471 B2* | 8/2018 | Dabrowski | H04L 45/66 |
| 10,462,054 B2* | 10/2019 | Hall | H04L 69/22 |
| 2002/0087727 A1* | 7/2002 | Tawil | H04L 61/50 |
| | | | 709/250 |
| 2003/0199272 A1* | 10/2003 | Shvodian | H04J 3/1647 |
| | | | 455/515 |
| 2006/0159049 A1* | 7/2006 | Chung | H04L 61/5084 |
| | | | 455/436 |
| 2006/0221960 A1* | 10/2006 | Borgione | H04L 12/465 |
| | | | 370/254 |
| 2007/0201490 A1* | 8/2007 | Mahamuni | H04L 45/24 |
| | | | 370/395.54 |
| 2007/0232305 A1* | 10/2007 | Jung | H04W 76/11 |
| | | | 455/435.1 |
| 2007/0253409 A1 | 11/2007 | Fu et al. | |
| 2014/0269610 A1* | 9/2014 | Hiben | H04W 48/18 |
| | | | 370/331 |
| 2015/0074539 A1* | 3/2015 | Hou | G06F 16/285 |
| | | | 715/739 |
| 2015/0131674 A1* | 5/2015 | Kao | H04L 61/2596 |
| | | | 370/420 |
| 2015/0143371 A1* | 5/2015 | Ackley | G06F 9/45558 |
| | | | 718/1 |
| 2015/0264081 A1* | 9/2015 | Lee | H04L 63/1466 |
| | | | 726/22 |
| 2016/0164848 A1 | 6/2016 | Wainner et al. | |
| 2016/0205588 A1* | 7/2016 | Liu | H04L 69/22 |
| | | | 370/392 |
| 2016/0373353 A1* | 12/2016 | Dabrowski | H04L 45/74 |
| 2020/0059460 A1 | 2/2020 | Orr et al. | |
| 2020/0137676 A1* | 4/2020 | Yoon | H04W 64/006 |
| 2020/0169548 A1* | 5/2020 | Yin | H04W 12/03 |
| 2021/0105522 A1 | 4/2021 | Grigore | |
| 2024/0214778 A1* | 6/2024 | McCann | H04W 4/06 |

* cited by examiner

GROUP IDENTITY ASSIGNMENT AND POLICY ENFORCEMENT FOR DEVICES WITHIN THE SAME NETWORK

TECHNICAL FIELD

The present disclosure relates generally to group identity assignment and policy enforcement.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Group identity assignment and policy enforcement may be provided. A User Defined Network Identifier (UDN ID) defining a group of client devices may be received. Next, a client identifier (ID) associated with a source client device that is associated with the group of client devices may be received. The UDN ID and the client ID may be encoded in an Extended Local Identifier (ELI) Media Access Control (MAC) address associated with the source client device. A source MAC address of a packet received from the source client device may then be substituted with the ELI MAC address. Then the packet may be forwarded.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In some situations, such as multi-dwelling units, university dorms, or hospitals, for example, where service environments may be shared (e.g., broadcast media, multiple WLAN and wired ports) users may own several connected devices that should be able to communicate with each other. However, communication should be blocked across devices belonging to different users. With conventional systems, these devices may be connected on the same WLAN, or via different WLANs or wired ports. For example, a user may have a laptop, a phone, and a video entertainment device. The user may wish to discover only the user's own video entertainment device and not others that may belong to other users. Accordingly, a process for providing group identity assignment and policy enforcement may be desired.

Some conventional vendor specific solutions may enable a user to define a group of devices within a certain WLAN, add devices to this group, and enforce policies such as peer-to-peer blocking across groups, multicast containment, etc. However, these solutions work only with vendor specific equipment and specific architectures at least because the required policies may be enforced on vendor specific controllers or require a vendor specific infrastructure to deliver the mapping to the wired infrastructure.

One challenge in multi-vendor environments may be that the communication is not understood at different policy enforcement points due to the multi-vendor equipment operating differently. Consequently, embodiments of the disclosure may encode a User Defined Network (UDN) Identifier (ID) and a client ID within a source Media Access Control (MAC) address of a frame. Policy enforcement, such as traffic containment between groups, may be able to use the encoded UDN-ID and client ID through a distributed architecture (e.g., a flex connect local switching or where traffic may be dropped off on the first hop switch). Accordingly, embodiments of the disclosure may allow group and client identity to traverse a network using an in-band assignment/encoding process in a multi-vendor environment.

Figure 1:
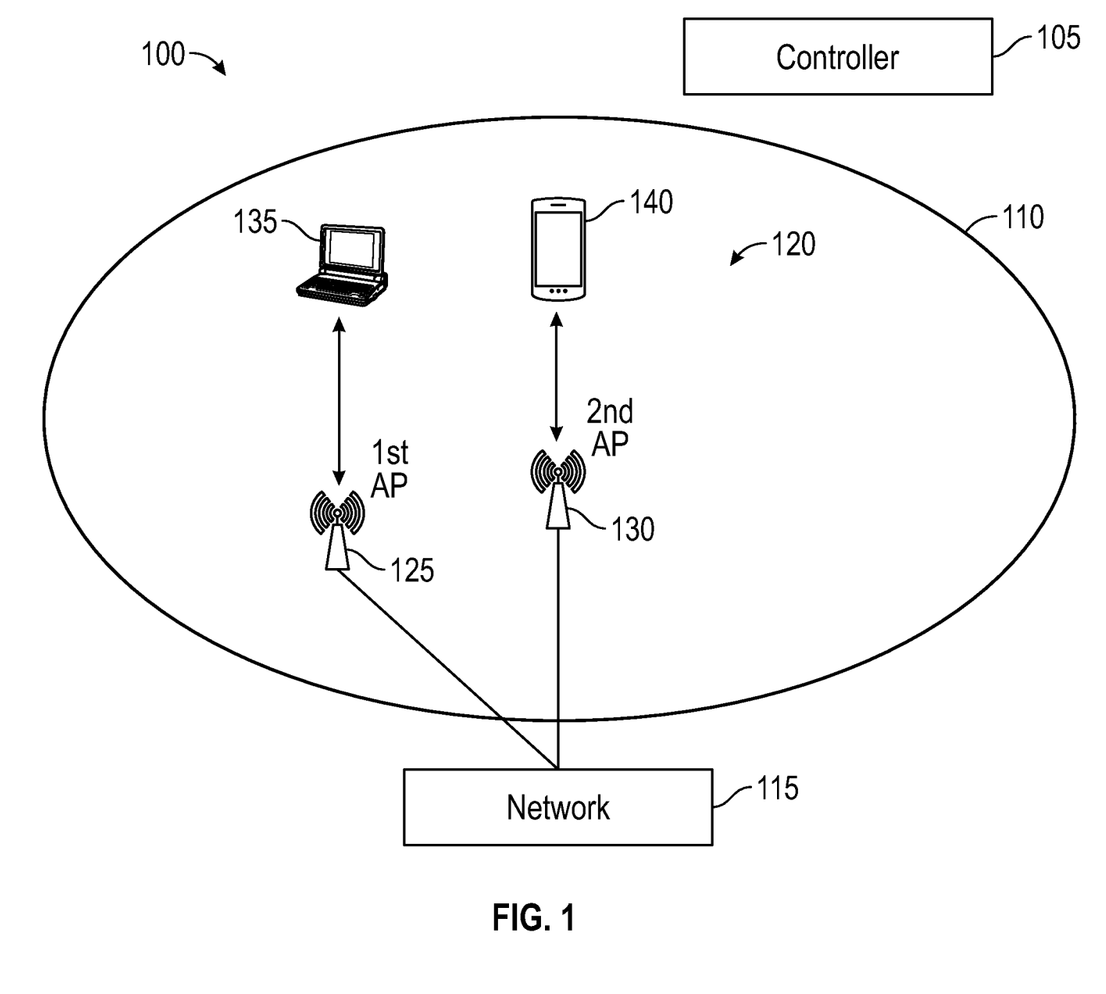
FIG. 1 is a block diagram of an operating environment for providing group identity assignment and policy enforcement.

FIG. 1 shows an operating environment 100 for providing group identity assignment and policy enforcement. As shown in FIG. 1, operating environment 100 may comprise a controller 105, a coverage environment 110, and a network 115. Coverage environment 110 may comprise, but is not limited to, a Wireless Local Area Network (WLAN) comprising a plurality of stations 120. The plurality of stations 120 may comprise a plurality of Access Points (APs) and a plurality of client devices. At any given time, any one of the plurality of stations 120 may comprise an Initiating Station (ISTA) or a Responding Station (RSTA). The plurality of APs may provide wireless network access (e.g., access to the WLAN) for the plurality of client devices. The plurality of APs may comprise a first AP 125 and a second AP 130. Each of the plurality of APs may be compatible with specification standards such as, but not limited to, the Institute of Electrical and Electronics Engineers (IEEE) 802.11 specification standard for example. Coverage environment 110 may comprise, but is not limited to, an outdoor wireless environment, such as a mesh (e.g., a Wi-Fi mesh). Embodiments of the disclosure may also apply to indoor wireless environments and non-mesh environments.

Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, an Automated Transfer Vehicle (ATV), a drone, an Unmanned Aerial Vehicle (UAV), or other similar microcomputer-based device. In the example shown in FIG. 1, the plurality of client devices may comprise a first client device 135 (e.g., a laptop computer) and a second client device 140 (e.g., a smart phone).

Controller 105 may comprise a Wireless Local Area Network controller (WLC) and may provision and control operating environment 100 (e.g., the WLAN). Controller 105 may allow the plurality of client devices to join operating environment 100. In some embodiments of the disclosure, controller 105 may be implemented by a Digital Network Architecture Center (DNAC) controller (i.e., a Software-Defined Network (SDN) controller) that may configure information for operating environment 100 in order to provide group identity assignment and policy enforcement consistent with embodiments of the disclosure.

The elements described above of operating environment 100 (e.g., controller 105, first AP 125, second AP 130, first client device 135, and second client device 140) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

Figure 2:
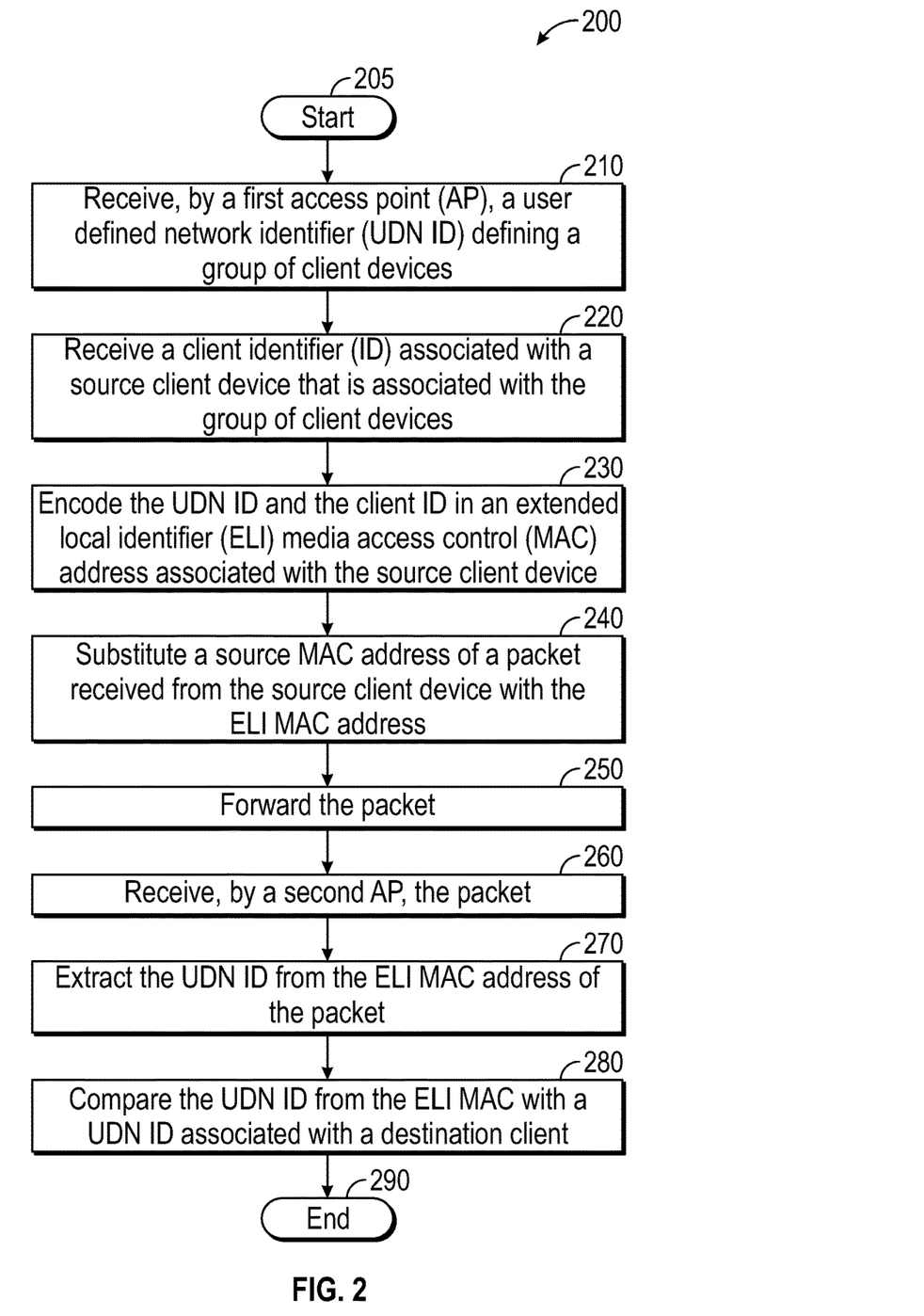
FIG. 2 is a flow chart of a method for providing group identity assignment and policy enforcement.

FIG. 2 is a flow chart setting forth the general stages involved in a method 200 consistent with an embodiment of the disclosure for providing group identity assignment and policy enforcement. Method 200 may be implemented using first AP 125 and second AP 130 as described in more detail above with respect to FIG. 1. Ways to implement the stages of method 200 will be described in greater detail below.

Method 200 may begin at starting block 205 and proceed to stage 210 where first AP 125 may receive a User Defined Network Identifier (UDN ID) defining a group of client devices. For example, when UDN is deployed, each client device (e.g., first client device 135 and second client device 140) joining the WLAN (e.g., coverage environment 110) may be assigned a UDN ID. Client devices belonging to the same user (or family for example) may be assigned the same UDN-ID that may enable policies to be enforced on the group of client devices. If first client device 135 and second client device 140 belong to the same user, they may be assigned the same UDN ID. This may allow the client devices belonging to the same group of client devices to communicate with each other. If first client device 135 and second client device 140 do not belong to the same user, they may be assigned different UDN IDs. This may keep the client devices belonging to different groups of client devices from communicate with each other.

The UDN ID may be generated when the user or the group of client devices are provisioned. Controller 105, first AP 125, second AP 130, or another device may generate the UDN ID. UDN-ID may also be generated by a cloud service.

From stage 210, where first AP 125 receives the UDN ID defining the group of client devices, method 200 may advance to stage 220 where first AP 125 may receive a client identifier (ID) associated with a source client device (i.e., first client device 135) that is associated with the group of client devices. For example, the client ID may be generated as part of the authentication process (e.g., 802.1x, MAC Address Bypass (MAB), etc.) when authenticating first client device 135 or second client device 140.

Once first AP 125 receives the client ID associated with the source client device (i.e., first client device 135) that is associated with the group of client devices in stage 220, method 200 may continue to stage 230 where first AP 125 may encode the UDN ID and the client ID in an Extended Local Identifier (ELI) Media Access Control (MAC) address associated with the source client device (i.e., first client device 135). For example, embodiments of the disclosure may provide a process to carry a unique UDN ID on a wire (i.e., between first AP 125 and network 115 and between second AP 130 and network 115) by encoding the UDN ID and client ID in the ELI MAC address. This ELI MAC address may identify the client device (i.e., first client device 135) and the group of client devices it belongs to.

Figure 3:
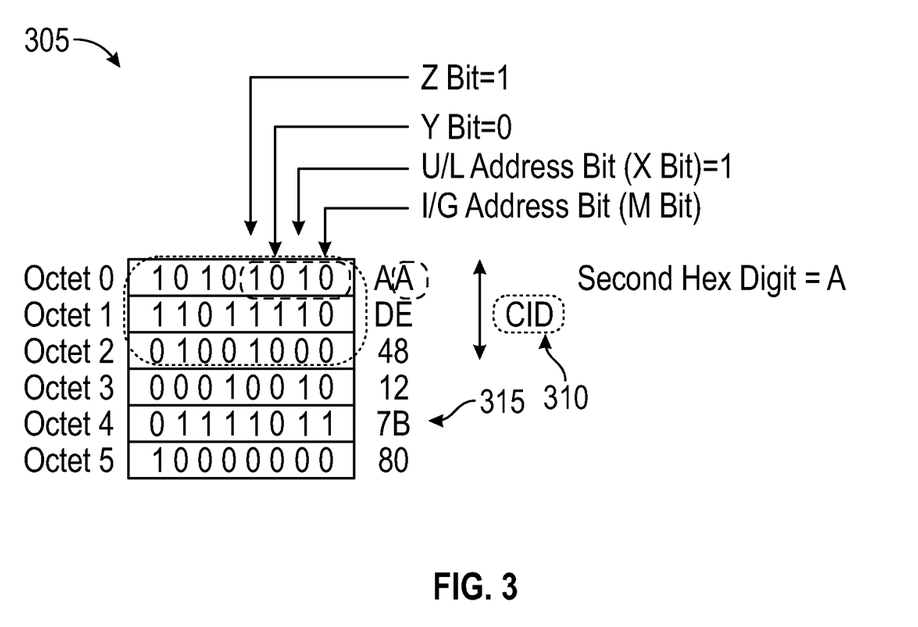
FIG. 3 is a diagram illustrating six octets of an Extended Local Identifier (ELI) Media Access Control (MAC) address.

FIG. 3 is a diagram illustrating an ELI MAC address 305. ELI MAC address 305 may comprise a Company Identifier (CID) portion 310 and a UDN ID/client ID portion 315. CID portion 310 may comprise an Organizationally Unique Identifier (OUI) and may be assigned by IEEE. As shown in FIG. 3, CID portion 310 may comprise a 24-bit (three-octet) sequence. Octet 0 is the initial (most significant) octet. The four least significant bits of Octet 0 may be designated the M bit, X bit, Y bit, and Z bit, respectively, beginning with the least significant bit. In CID portion 310, the M, X, Y, and Z bits have the values 0, 1, 0, and 1, respectively. CID portion 310 may be represented as a base-16 number of six hexadecimal digits.

ELI MAC address 305 may be created by concatenation UDN ID/client ID portion 315 and CID portion 310, which may comprise the initial three (most significant) octets. AN ELI-48 may comprise a 48-bit ELI (e.g., shown in FIG. 3) and an ELI-64 may comprise a 64-bit ELI. Since CID assignments made by the IEEE have the X bit equal to 1, an ELI MAC address created as an extended identifier from an assigned CID has U/L=1 and is thus, when used as a MAC address, a local address.

As shown in FIG. 3, the UDN ID and the client ID may be encoded in ELI MAC address 305 in a second three octets of ELI MAC address 305 (e.g., octet 3, octet 4, and octet 5). For example, the UDN ID may be encoded in two bytes of the second three octets (e.g., octet 3 and octet 4) of ELI MAC address 305. Furthermore, the client ID may be encoded in one byte of the second three octets (e.g., octet 5) of ELI MAC address 305. An organization may request IEEE for the allocation of a CID to identify this scheme of encoding UDN ID+client ID as shown in FIG. 3.

After first AP 125 encodes the UDN ID and the client ID in the ELI MAC address associated with the source client device (i.e., first client device 135) in stage 230, method 200 may proceed to stage 240 where first AP 125 may substitute a source MAC address of a packet received from the source client device (i.e., first client device 135) with the ELI MAC address. For example, when first client device 135 generates traffic that should go on the wire (i.e., to network 115), first AP 125 may substitute the source MAC address of first client device 135 in the packet with ELI MAC address 305.

From stage 240, where first AP 125 substitutes the source MAC address of the packet received from the source client device (i.e., first client device 135) with the ELI MAC address, method 200 may advance to stage 250 where first AP 125 may forward the packet. For example, first AP 125 may forward the packet to network 115 and may maintain a mapping the ELI MAC address to the source MAC address in a table.

Once first AP 125 forwards the packet in stage 250, method 200 may continue to stage 260 where second AP 130 may receive the packet. For example, second AP 130 may receive the packet from network 115.

After second AP 130 receives the packet in stage 260, method 200 may proceed to stage 270 where second AP 130 may extract the UDN ID from the ELI MAC address of the packet. For example, second AP 130 may extract the UDN ID from ELI MAC address 305 of the packet that was previously encoded.

From stage 270, where second AP 130 extracts the UDN ID from the ELI MAC address of the packet, method 200 may advance to stage 280 where second AP 130 may compare the UDN ID from the ELI MAC with a UDN ID associated with a destination client (i.e., second client device 140). For example, in this is a peer-to-peer communication, because the destination client (i.e., second client device 140) may be connected to another AP/switch (i.e., second AP 130), when the AP/switch (i.e., second AP 130) at the destination receives the packet, it extracts the UDN ID from the packet and compares it with a UDN ID associated with the destination client (i.e., second client device 140). Based on this comparison, the AP/switch (i.e., second AP 130) may apply the configured policies. For example, second AP 130 may drop the packet if peer-to-peer blocking (across groups) is enabled and the UDN ID extracted from the packet is not the same as the UDN ID associated with second client device 140. Alternatively, second AP 130 may forward the packet to second client device 140 if the UDN ID extracted from the packet is the same as the UDN ID associated with second client device 140.

Similarly, for multicast traffic, the AP/Switch may substitute a destination MAC address with an ELI multicast MAC address that may encode the UDN ID and multicast protocol. When an AP/Switch receives a frame with a multicast ELI destination MAC address, it may extract the UDN ID and forward the packet only to clients having the same UDN ID. As an alternative, the AP/Switch may behave similarly to the unicast case, where it may replace the source MAC address with the ELI MAC address and keep the original destination MAC address (multicast). Consequently, embodiments of the disclosure may provide a process to enable in-band group identity and apply policy to link-local multicast and unicast traffic among a group of devices in the same network, using an ELI MAC address, in a distributed forwarding plane environment. Once second AP 130 compares the UDN ID from the ELI MAC with the UDN ID associated with the destination client (i.e., second client device 140) in stage 280, method 200 may then end at stage 290.

Figure 4:
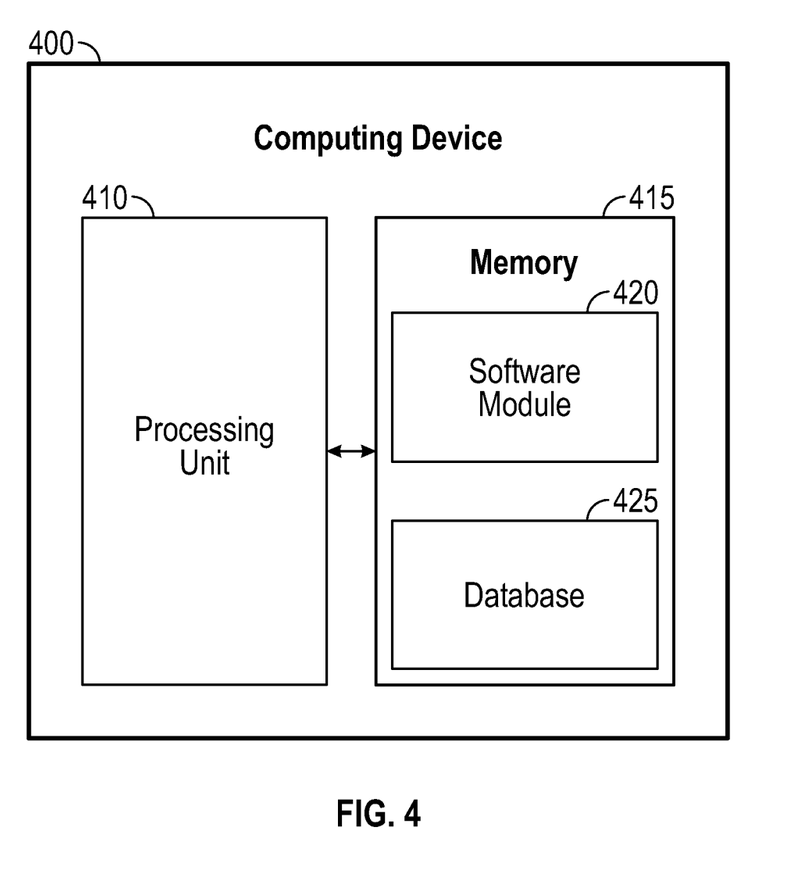
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing group identity assignment and policy enforcement as described above with respect to FIG. 2. Computing device 400, for example, may provide an operating environment for controller 105, first AP 125, second AP 130, first client device 135, or second client device 140. Controller 105, first AP 125, second AP 130, first client device 135, and second client device 140 may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
receiving, by a first Access Point (AP), a User Defined Network Identifier (UDN ID) defining a group of client devices, wherein each client device of the group of client devices is assigned a same UDN ID;
receiving, by the first AP, a client ID associated with a source client device that is associated with the group of client devices;
encoding, by the first AP, the UDN ID and the client ID in an Extended Local Identifier (ELI) Media Access Control (MAC) address associated with the source client device;
substituting, by the first AP, a source MAC address of a packet received from the source client device with the ELI MAC address; and
forwarding, by the first AP, the packet.

2. The method of claim 1, further comprising:
receiving, by a second AP, the packet;
extracting the UDN ID from the ELI MAC address of the packet; and
comparing the UDN ID from the ELI MAC address with a UDN ID associated with a destination client.

3. The method of claim 2, further comprising:
forwarding, by the second AP, the packet to the destination client when comparing the UDN ID from the ELI MAC address with the UDN ID associated with the destination client indicates the UDN ID from the ELI MAC address and the UDN ID of the destination client match.

4. The method of claim 2, further comprising:
dropping, by the second AP, the packet when comparing the UDN ID from the ELI MAC address with the UDN ID associated with the destination client indicates the UDN ID from the ELI MAC address and the UDN ID of the destination client do not match.

5. The method of claim 1, further comprising mapping the ELI MAC address to the source MAC address in a table.

6. The method of claim 1, further comprising encoding a Company ID in a first three octets of the ELI MAC address.

7. The method of claim 1, wherein encoding the UDN ID and the client ID in the ELI MAC address comprises encoding the UDN ID and the client ID in the ELI MAC address in a second three octets of the ELI MAC address.

8. The method of claim 7, wherein encoding the UDN ID and the client ID in the ELI MAC address in the second three octets of the ELI MAC address comprises encoding the UDN ID in two bytes of the second three octets of the ELI MAC address.

9. The method of claim 7, wherein encoding the UDN ID and the client ID in the ELI MAC address in the second three octets of the ELI MAC address comprises encoding the client ID in one byte of the second three octets of the ELI MAC address.

10. The method of claim 1, wherein the UDN ID was generated when the group of client devices was provisioned.

11. The method of claim 1, wherein the client ID was generated when the source client device was authenticated.

12. A system comprising:
a memory storage; and
a processing unit implemented using at least one hardware processor coupled to the memory storage, wherein the processing unit is operative to:
receive a User Defined Network Identifier (UDN ID) defining a group of client devices, wherein each client device of the group of client devices is assigned a same UDN ID,
receive a client ID associated with a source client device that is associated with the group of client devices, encode the UDN ID and the client ID in an Extended Local Identifier (ELI) Media Access Control (MAC) address associated with the source client device, substitute a source MAC address of a packet received from the source client device with the ELI MAC address, and forward the packet.

13. The system of claim 12, wherein the processing unit is further operative to encode a Company ID in a first three octets of the ELI MAC address.

14. The system of claim 12, wherein the processing unit being operative to encode the UDN ID and the client ID in the ELI MAC address comprises the processing unit being operative to encode the UDN ID and the client ID in the ELI MAC address in a second three octets of the ELI MAC address.

15. The system of claim 14, wherein the processing unit being operative to encode the UDN ID and the client ID in the ELI MAC address in the second three octets of the ELI MAC address comprises the processing unit being operative to encode the UDN ID in two bytes of the second three octets of the ELI MAC address.

16. The system of claim 14, wherein the processing unit being operative to encode the UDN ID and the client ID in the ELI MAC address in the second three octets of the ELI MAC address comprises the processing unit being operative to encode the client ID in one byte of the second three octets of the ELI MAC address.

17. A non-transitory computer-readable medium that stores a set of instructions which when executed perform a method executed by the set of instructions comprising:

receiving, by a first Access Point (AP), a User Defined Network Identifier (UDN ID) defining a group of client devices, wherein each client device of the group of client devices is assigned a same UDN ID;

receiving a client ID associated with a source client device that is associated with the group of client devices;

encoding the UDN ID and the client ID in an Extended Local Identifier (ELI) Media Access Control (MAC) address associated with the source client device;

substituting a source MAC address of a packet received from the source client device with the ELI MAC address; and forwarding the packet.

18. The non-transitory computer-readable medium of claim 17, wherein encoding the UDN ID and the client ID in the ELI MAC address comprises encoding the UDN ID and the client ID in the ELI MAC address in a second three octets of the ELI MAC address.

19. The non-transitory computer-readable medium of claim 18, wherein encoding the UDN ID and the client ID in the ELI MAC address in the second three octets of the ELI MAC address comprises encoding the UDN ID in two bytes of the second three octets of the ELI MAC address.

20. The non-transitory computer-readable medium of claim 18, wherein encoding the UDN ID and the client ID in the ELI MAC address in the second three octets of the ELI MAC address comprises encoding the client ID in one byte of the second three octets of the ELI MAC address.

* * * * *